United States Patent [19]

Gawrilow

[11] 3,906,117

[45] Sept. 16, 1975

[54] HYDRATED PAN RELEASE AGENTS

[75] Inventor: Ilija Gawrilow, Brookpark, Ohio

[73] Assignee: SCM Corporation, New York, N.Y.

[22] Filed: Jan. 17, 1974

[21] Appl. No.: 434,127

[52] U.S. Cl. ............... 426/420; 426/602; 426/811
[51] Int. Cl.² ........................................... A23D 5/00
[58] Field of Search .......... 426/362, 363, 194, 198, 426/417, 197, 420

[56] References Cited

UNITED STATES PATENTS

| | | | |
|---|---|---|---|
| 2,610,125 | 9/1952 | Valko | 426/194 |
| 3,253,927 | 5/1966 | Going | 426/194 |
| 3,261,691 | 7/1966 | Erickson | 426/362 |
| 3,269,844 | 8/1966 | Erickson | 426/362 |
| 3,433,645 | 3/1969 | Egan | 426/24 |
| 3,490,918 | 1/1970 | Egan et al. | 426/194 |

*Primary Examiner*—Samih N. Zaharna
*Assistant Examiner*—Ernest G. Therkorn
*Attorney, Agent, or Firm*—Thomas M. Schmitz

[57] ABSTRACT

Baking pans are treated with a hydrated pan release agent comprising an oil-in-water emulsion of a mixture of glycerides of ethoxylated mono- and diglycerides, soft mono- and diglycerides, soybean stearine, and soybean oil all dispersed in water.

2 Claims, No Drawings

HYDRATED PAN RELEASE AGENTS

BACKGROUND OF THE INVENTION

It is well known in the baking art that baking pans must be properly prepared prior to panning molded dough to prevent the unbaked or baked dough from adhering to the internal metallic pan surfaces. Greasing baking pans is commonly known wherein oil films are applied to pan surfaces. In commercial baking processes, pan release agents ordinarily comprise vegetable oils alone or in combination with minor amounts of mineral oils. More recently, silicon resins have been used as pan glazes although silicon-treated pan surfaces often require subsequent treatment with conventional de-panning oils to prolong the life of the silicon resin.

In continuous commercial baking processes, the prevention of sticking or adhesion of the bread product to the bread pan surface is most important so as to avoid interruption of the smooth flow of automatic equipment. When sticking occurs, manual removal of the bread products is usually required which often damages either the pan or the bread product and sometimes both.

It now has been found that a very desirable and reliable hydrated pan release agent can be applied to the interior surfaces of a baking pan to advantageously overcome sticking and adhesion of the bread products to the bread pan surfaces. The hydrated pan release agent of this invention comprises an oil-in-water emulsion and is substantially more effective than comparable non-hydrated components as well as hydrated water-in-oil emulsions. The pan release properties are quite surprising since water contained in the dough is the major cause of sticking. The oil-in-water pan release of this invention effectively minimizes carbonization of the pan release on the pan surface thereby minimizing the quantity of pan release required for subsequent applications.

Accordingly, it is a primary object of this invention to provide a hydrated, oil-in-water pan release agent for application onto the interior surfaces of bread pans to substantially eliminate sticking of baked bread products to baking pan surfaces without adversely affecting the baked bread product.

A further object of this invention is to apply a hydrated pan release to a silicon-treated baking pan surface whereby the life of the silicon-treated surface is increased substantially.

Still a further object is to provide an oil-in-water emulsion pan release adapted to provide excellent release properties with minimal oil content so as to prevent carbonized fat build-up and minimize sanitation problems.

These and other advantages of the invention will become more apparent from the Detailed Description of the Invention.

SUMMARY OF THE INVENTION

Bread products are released from baking pans without adhesion thereof to the baking pan surface by treating the bread pan surfaces with a hydrated pan release comprising an oil-in-water emulsion of a glyceride mixture. The method of treating the bread pan surface comprises providing a stabilized glyceride mixture of about 2 to 8 weight parts of ethoxylated mono- and diglycerides, 4 to 14 weight parts of soft mono- and diglycerides, 0 to 8 weight parts of solid stearine, and about 40 to 100 weight parts of liquid vegetable oils; then hydrating the glyceride mixture by dispersing the same in water to produce an emulsified glyceride mixture having between about 30 to 70 weight percent water; and applying the emulsified glyceride mixture to the surface of the baking pans prior to panning molded dough pieces into the pans whereby baked products are efficiently released from the baking pans after baking.

DETAILED DESCRIPTION OF THE INVENTION

Baking products are efficiently released from baking pans by providing a stabilized, emulsified glyceride mixture comprising minor amounts of soft mono- and diglycerides, soybean stearine, ethoxylated monoglyceride, and major amounts of liquid vegetable oil.

A stabilized mixture of glycerides is provided by mixing on a weight basis about 4 to 14 weight parts of soft mono- and diglycerides, 2 to 8 weight parts of ethoxylated monoglyceride, 0 to 8 weight parts of solid or hard stock stearine, and the balance being at least about 40 weight parts and up to 100 weight parts of liquid vegetable oil. The foregoing glyceride components are heated to a temperature sufficient to liquefy all of the components and provide a substantially uniform blend which usually is about 130° to 150°F. The liquid blend of glycerides is then passed through a swept-surface heat exchanger for quick chilling of the liquid blend and for promoting beta-crystal formation within the liquid blend. The temperature of the blend is chilled quickly to at least about 85°F through a device commonly referred to as a Votator A Unit, as described in U.S. Pat. No. 3,011,896, and incorporated herein by reference. The fluid blend is then transported to a holding tank similar in construction to the swept-surface heat exchanger and sometimes referred to in the art as a Votator B Unit which further maintains the chilled blend at about 82° to 88°F and allows beta-crystallization to develop and promote a uniform dispersion of the fat crystals within the liquid vegetable oil. Thereafter, the stabilized glyceride mixture is passed to a stehling tank for continuous agitation at temperatures between about 80° to 90°F to completely convert the fat crystals to beta-crystals. The stabilization of the glyceride mixture is more particularly set forth in copending and commonly assigned Norris application Ser. No. 361,320 filed May 17, 1973 now abandoned, and incorporated herein by reference.

The stabilized glyceride mixture is thereafter hydrated by mixing the glyceride mixture together with water with agitation to produce an oil-in-water emulsion containing between about 30 to 70 weight percent of water. The emulsified glyceride mixture can be produced by high-speed agitation but preferably is produced by votating a suitable mixture of water and stabilized glycerides. The water and glyceride mixture is fed to a Votator A Unit at a temperature of about 110° to 120°F and uniformly blended together within the Votator A Unit. The votated mixture exits at a temperature of about 67° to 77°F and thereafter fed directly to a Votator B Unit. The hydrated glyceride mixture exits from the Votator B Unit at 70° to 80°F. The hydrated mixture of glycerides is a stable hydrated pan release agent containing 30 to 70 weight percent water wherein the glyceride mixtures comprise soft mono- and diglycerides, soybean stearine, ethoxylated monoglyceride, and major amounts of liquid vegetable oil.

Referring now to the stabilized glyceride mixture, the soft mono- and diglycerides in the mixture are a mixture of unsaturated and saturated glycidal esters of fatty acid typically derived from hydrogenated and non-hydrogenated vegetable oils such as soybean oil, corn oil, olive oil, peanut oil, safflower oil, cottonseed oil, palm oil, and like vegetable oils, and animal fats such as tallow and lard. The soft mono- and diglycerides have an iodine value in the broad range from about 40 to 150 wherein the soft mono- and diglycerides derived from vegetable oils preferably have an iodine value between 65 and 150. Animal fats preferably have an iodine value between about 40 and 65. The preferred iodine number range of the soft mono- and diglycerides is between about 40 and 85.

The glyceride mixture further includes between about 2 to 8 weight parts of ethoxylated monoglyceride which is a mixture of ethoxylated mono- and diglycerides. Ethoxylated monoglycerides are polyethoxylated esters of glycerol predominantly poly esters of glycerols and conventionally described as mixtures of stearate, palmitate, and myristate partial esters of glycerol condensed with about 20 moles of ethylene oxide per mole of alpha-monoglyceride as defined in The Food Codex and FDA Regulations, and more particularly described in the Egan patent, U.S. Pat. No. 3,433,645, and incorporated herein by reference. Preferred ethoxylated monoglycerides contain higher fatty acid chains having about 12 to 18 carbon atoms and the glycerol ester preferably contains about 18 to 22 moles of ethylene oxide per mole of glycerol ester wherein the oxyethylene content thereof is about 55 to 75 weight percent of the total ethoxylated glyceride composition.

The mixture of glycerides further includes solid stearine derived from beta-tending fats such as soybean oil, peanut oil, safflower oil, and hydrogenated lard. The preferred solid stearine is soybean stearine having an iodine number of about 0 to 5 and derived from hydrogenated soybean oil.

The glyceride mixture further includes major amounts of liquid vegetable oils commonly referred to as lipids, primarily consisting of triglycerides and being at least about 90 weight percent and preferably at least about 95 weight percent glycerol esters of fatty acid. Suitable liquid vegetable oils include, for example, soybean oil, cottonseed oil, peanut oil, mustardseed oil, safflower seed oil, corn oil, and like liquid vegetable oils.

The glyceride mixture is stabilized and then hydrated with water to produce a hydrated glyceride mixture, as hereinbefore described. The hydrated glyceride mixture containing between about 30 to 70 percent water by weight can be readily applied to pan surfaces to provide excellent lubricating properties to bread pan surfaces. The hydrated glyceride mixture is effectively applied to pan surfaces by manual wiping, brushing, or automatic spray. The preferred method of application is spraying wherein better controlled films are sprayed by automatic or semi-automatic spray devices whereby excellent spread and lubricating properties are imparted to the pan surface. An effective amount of hydrated glycerides applied to the pan surface to impart suitable pan release properties is ordinarily between about 1 to 6 milligrams of hydrated glyceride mixture per 1 $cm^2$ of pan surface wherein the hydrated mixture contains between about 30 to 70 percent water.

Treating baking pan surfaces with the hydrated pan release has been found to be most effective as a pan release which is quite surprising since the presence of water is generally considered to be detrimental and, in fact, promotes adhesion of the baked products to the baking pan. The unbaked bread dough spreads out into the pan as well as bakes uniformly without darkening or browning the baked product wall. Gumming of the pan release agent is no longer a problem which similarly is unexpected since the glyceride mixture is rather high in unsaturated glyceride components. The hydrated glyceride mixture functions exceptionally well as a pan release agent, divider agent, trough grease, and other applications in bakeries where lubricity is necessary.

The following examples further illustrate the merits of this invention but are not to be construed as limiting. All the parts shown are by weight and the temperatures are in degrees Fahrenheit.

EXAMPLE 1

A stabilized glyceride mixture was produced from the following ingredients:

82 lbs. of soybean oil
8 lbs. of soft mono- and diglycerides having at least 50% monoglyceride, an I.V. of 70, and a melting point of 125°F
5 lbs. of ethoxylated mono- and diglycerides
5 lbs. of soybean stearine.

A. The above ingredients were charged into a holding tank, heated to 130°F, and agitated at temperatures of 130° to 135°F until a molten mixture was obtained.

B. The molten mixture was then pumped at a temperature of about 135°F to a first Votator A Unit wherein the mixture was rapidly cooled to a chilled uniform blend and exited from the Votator A Unit at a temperature of approximately 80° to 85°F.

C. The stabilized glyceride mixture was then pumped through a Votator B Unit for through-put for working (mild agitation) whereby the chilled blend was maintained at 82° to 86°F to produce a stabilized glyceride mixture. Holding time of the chilled blend within the Votator B Unit was about one minute.

D. The stabilized glyceride was then continuously agitated at 80° to 90°F in a stehling tank at about 16 RPM for a period of at least about 40 hours.

EXAMPLE 2

The stabilized glyceride mixture of Example 1 was mixed with water to provide an oil-in-water emulsified glyceride mixture containing 50 parts glyceride mixture and 50 parts water. The emulsion was produced by passing the water and glyceride mixture at a temperature of about 120°F through a Votator A Unit which uniformly cooled the mixture to about 73°F and stabilized the emulsion. The mixture was then passed through a Votator B Unit wherein the exiting hydrated glyceride mixture had a temperature of about 75°F.

The hydrated glyceride mixture was then applied manually to surfaces of baking pans as a pan release and tested. About 4 milligrams of pan release were applied per 1 $cm^2$ pan surface.

The pans were tested with a bread containing the following ingredients:
100 lbs. bread flour
2 lbs. of sugar
2 lbs. of salt 3.2 lbs. of yeast
0.7 lbs. of yeast food
67.0 lbs. of water
15/16 ppm. of $KIO_3/KBrO_3$
0.1 lbs. of sodium propionate mold inhibitor
and spike of the following composition:
2 lbs. high heat milk solids
5 lbs. of sugar.

The foregoing bread mixture was worked into an unbaked dough, then panned within the pre-coated baking pans being coated with the hydrated release agent of Example 1, then baked at about 425°F to produce a baked product. After baking is completed, the baked bread was easily released from the baking pans without sticking or adhering to the interior surface of the baking pan. The bread walls were of excellent stability, were not undesirable brown, and no gumming of the pan release agent on either the pan or the surface of the bread was apparent.

EXAMPLE 3

A similar series of tests were made wherein the unhydrated oil system was mixed with varying amounts of water to produce hydrated pan release agents which were tested in a manner similar to Example 2. The results are shown in Table 1 following:

TABLE 1

| Pounds Pan Release Agent | Pounds Water | Total | Pan Release Properties | Emulsion Stability |
|---|---|---|---|---|
| 90 | 10 | 100 | Poor release | Unstable emulsion |
| 80 | 20 | 100 | Poor release | Unstable emulsion |
| 70 | 30 | 100 | Good release | Stable emulsion |
| 60 | 40 | 100 | Good release | Stable emulsion |
| 50 | 50 | 100 | Excellent release | Stable emulsion |
| 40 | 60 | 100 | Excellent release | Stable emulsion |
| 30 | 70 | 100 | Excellent release | Stable emulsion |
| 20 | 80 | 100 | Poor release | Unstable emulsion |
| 10 | 90 | 100 | Poor release | Unstable emulsion |

The foregoing examples are illustrative of the advantages of the hydrated pan release agent of this invention, but the examples are not intended to be limiting except as defined in the following claims.

I claim:

1. A method of treating baking pans to prevent adhesion of a baked product to the baking pan surface, comprising:

providing a pan release agent of a fluid, stabilized glyceride mixture containing between about 4 to 14 weight parts of soft mono- and diglycerides having an Iodine value of at least about 40, 2 to 8 weight parts of ethoxylated monoglyceride, up to 8 weight parts of solid stearine, and between about 40 to 100 weight parts of liquid vegetable oils; heating to form a molten mixture; rapidly cooling said molten mixture to a temperature of at least 85°F to initiate Beta crystal formation and produce a chilled blend having dispersed fat crystals; working said chilled blend at temperatures between 82° to 88°F to develop Beta crystal formation and produce a substantially uniform dispersion wherein the fat crystals are in equilibrium with said liquid vegetable oil; fluidizing said uniform dispersion by agitating at temperatures of 80° to 90°F for time sufficient to complete beta crystal formation;

hydrating said pan release agent to provide a stabilized oil-in-water emulsion containing between about 30% to 70% by weight of water; and applying said hydrated pan release agent to the baking surface of said baking pan.

2. The method of claim 1 wherein the pan release agent is hydrated to provide a stabilized oil-in-water emulsion containing between about 50 to 70 percent by water.

* * * * *